March 2, 1965    W. A. GENTHE    3,171,578
CAR TOP CARRIER AND JOINT
Filed Oct. 23, 1962
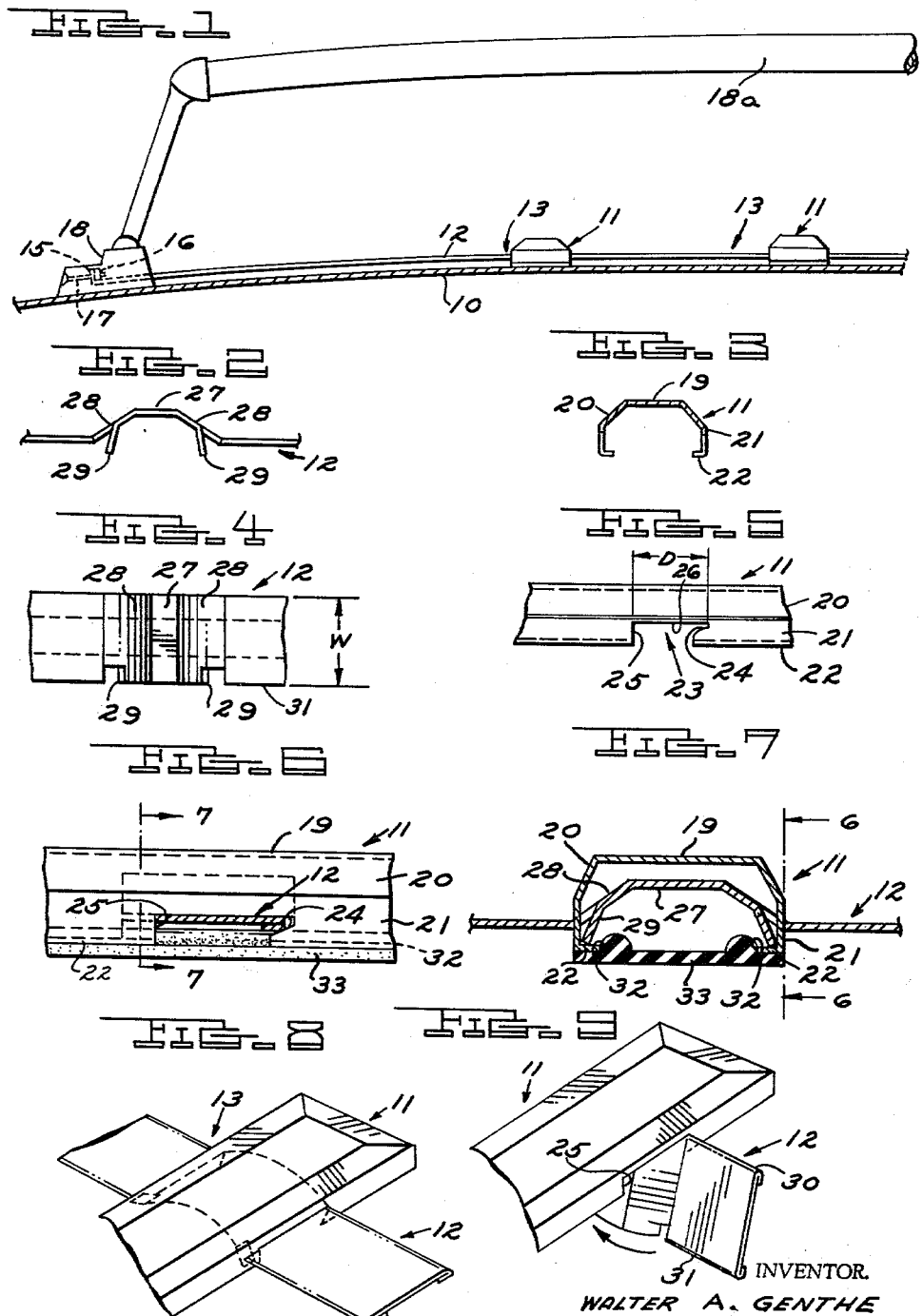

United States Patent Office 3,171,578
Patented Mar. 2, 1965

3,171,578
CAR TOP CARRIER AND JOINT
Walter A. Genthe, Detroit, Mich., assignor to Helm Accessories, Inc., Detroit, Mich., a corporation of Michigan
Filed Oct. 23, 1962, Ser. No. 232,485
5 Claims. (Cl. 224—42.1)

This invention relates to car top carriers and particularly to car top carriers of the type wherein longitudinally and transversely extending members are provided on the car top in overlapping relation.

It is an object of this invention to provide a car top carrier of novel design which is adapted to rest upon the roof of a car and be fastened thereto.

It is a further object of the invention to provide such a car top carrier which can be readily assembled without the use of tools.

It is a further object of the invention to provide such a car top carrier which is low in cost.

It is a further object of the invention to provide such a car top carrier which utilizes a minimum number of parts and is readily and permanently locked.

Basically, the invention comprises providing a readily lockable joint between the overlapping longitudinally and transversely extending members. One of the members is provided with spaced side walls and inwardly extending flanges. Opposed portions of said walls and flanges are cut away and notches are formed in the cut-away portions into which one side of a cross member extends. The other side edge of the cross member is provided with spring tabs that snap inwardly and thereafter outwardly above the flange portions of the longitudinal extending members to lock the longitudinally and transversely extending members together. This is achieved without the use of tools and provides a permanent lock between the members that can only be disassembled by destroying the joint.

In the drawings:

FIG. 1 is a transverse fragmentary sectional view through a car top embodying the invention.

FIG. 2 is a fragmentary side elevational view of a portion of the length of a transversely extending cross member.

FIG. 3 is a cross sectional view of a longitudinally extending member.

FIG. 4 is a plan view of the portion of the cross member shown in FIG. 2.

FIG. 5 is a side elevational view of the portion of the longitudinally extending member shown in FIG. 3.

FIG. 6 is a fragmentary sectional view taken along the line 6—6 in FIG. 7.

FIG. 7 is a fragmentary sectional view taken along the line 7—7 in FIG. 6.

FIG. 8 is a fragmentary perspective view of a joint between the overlapping longitudinally extending member and transversely extending cross member of the carrier.

FIG. 9 is a fragmentary perspective view showing the longitudinally extending member and transversely extending cross member as they are assembled.

Referring to FIG. 1, the car top carrier embodying the invention is adapted to be mounted on a car top 10 which is of conventional metal construction and is curved both in longitudinal and transverse directions. The car top carrier comprises a plurality of transversely spaced longitudinally extending members 11 which rest on the car top and overlap longitudinally spaced transverse or cross members 12. The overlapping portions of the members 11 and 12 are connected by a joint 13 which embodies the invention.

Referring to FIGS. 1 and 8, each transversely extending member 12 is made of a strip of metal having substantially uniform thickness throughout. The longitudinal side edges 14 of each strip 12 are rolled (FIG. 8). The ends of the members 12 are bent upwardly as at 15 and a sheet metal nut 16 is fastened to the ends 15 to provide a means for threading and holding a screw 17 therein to retain the transverse strip 12 in position on the carrier. The carrier is provided with stanchions 18 at longitudinally spaced points, usually at the ends and middle of the carrier, to which the ends of some of the strips 12 are fastened.

As shown in FIGS. 3 and 7, each longitudinally extending member 11 is generally channel shaped in cross section and specifically frusto-pyramidal in cross section. Each member 11 includes a flat top portion 19, inclined side portions 20, vertical side walls 21 and inwardly turned flanges 22. At the portions where the longitudinally extending members 11 overlap the transversely extending members 12, the members 11 are cut away as at 23. One end of each cut-away portion defines a notch 24 and the other end 25 is vertical. The top 26 of cut-away portion is generally straight and horizontal. A resilient strip 33 is preferably provided between the car top and lock member 11.

Each transversely extending member 12 is provided with upwardly bent portions where the strip 11 overlaps (FIG. 2) including a flat top portion 27 and inclined portions 28. Tabs 29 are bent downwardly from one side edge 31 of inclined portions 28 into generally vertical relation as shown in FIG. 2. The width W of each transversely extending strip 12 is substantially equal to the width D of the upper part of the cut-away portion 23 (FIGS. 4-5).

As shown in FIG. 9, in order to assemble the members 11, 12, before the car top carrier is applied to the car top, each transversely extending strip 12 is brought into position so that one side edge 30 engages the notches 24 and the other edge 31 is then swung upwardly. As the other side edge 31 is swung upwardly, the tabs 29 are caused to be momentarily bent inwardly by engagement with the inwardly extending edges 32 of the flanges 22 and then snap outwardly above the flanges 22 to lock the transverse member 12 relative to the longitudinally extending member 11. The same operation is performed for fastening the remaining transversely extending members and longitudinally extending members to one another at each overlapping area.

In this manner, the transversely extending cross members 12 are locked relative to the longitudinally extending members 11 without the use of tools. The joint that is formed is secure and permanent and the parts cannot be disassembled without destroying the joint between the members.

The strip 12 is preferably made of a spring metal material so that the tabs have the required degree of resiliency in order that they will snap above the flange portions 22.

I claim:
1. In a car top carrier, the combination comprising
a plurality of longitudinally spaced members adapted to extend transversely of the top,
a plurality of transversely spaced cross members adapted to extend longitudinally of the car top,
one of said members overlapping the other
each said one member having spaced walls and longitudinally extending portions extending inwardly toward one another,
each said one member having portions of said spaced wall and inwardly extending portion cut away,
each said spaced wall having a notch at one end of said cut-away portion, each said other member extending upwardly into and having one longitudinal edge thereof engaging said notches, said other member having outwardly and downwardly extending tabs which are adapted to be sprung inwardly by the inwardly extending portions of said one member above and snap outwardly above said portions to hold said other member in engagement with said one member, the upper edge of each said cut away portion engaging the top of the corresponding portion of each transversely extending member, the width of each cut away portion at its upper end being substantially equal to the width of each transversely extending member less the width of the tabs.

2. In a car top carrier, the combination comprising
a plurality of longitudinally spaced members adapted to extend transversely of a car top,
a plurality of transversely spaced members adapted to extend longitudinally of said car top,
each of said longitudinally extending members being channel shaped and having spaced generally vertical walls and flanges extending inwardly from the lower edges of said vertical walls toward one another,
each of said longitudinally extending members overlying said transversely extending members,
each of said longitudinally extending members having opposed portions of said walls and flanges cut away at the points overlying said transversely extending members,
said cut-away portions defining notches at one end thereof into which one of said transverse members extend,
each of said transversely extending members having spring tabs bent downwardly and outwardly therefrom,
the width of said tabs being such that they will snap inwardly behind and above the flanges of said longitudinally extending members,
the upper edge of each said cut away portion engaging the top of the corresponding portion of each transversely extending member,
the width of each cut away portion at its upper end being substantially equal to the width of each transversely extending member less the width of the tabs.

3. The combination set forth in claim 2 wherein each transversely extending member has longitudinally extending rolled side edges.

4. In a car top carrier or the like wherein one member overlaps another, the improvement wherein
said one member having spaced walls and longitudinally extending portions extending inwardly toward one another,
said one member having portions of said spaced wall and inwardly extending portion cut away,
each said spaced wall having a notch at one end of said cut away portion,
said other member extending upwardly into and having one longitudinal edge thereof engaging said notches,
said other member having outwardly and downwardly extending tabs which are adapted to be sprung inwardly by the inwardly extending portions of said one member above and snap outwardly above said portion to hold said other member in engagement with said one member,
the upper edge of each said cut away portion engaging the top of the corresponding portion of each transversely extending member,
the width of each cut away portion at its upper end being substantially equal to the width of each transversely extending member less the width of the tabs.

5. In a car top carrier or the like wherein one member overlaps another, the improvement wherein
said one member being channel shaped and having spaced generally vertical walls and flanges extending inwardly from the lower edges of said vertical walls toward one another,
said one member having opposed portions of said walls and flanges cut away at the points overlying said other member,
said cut away portions defining notches at one end thereof into which said other member extends,
said other member having spring tabs bent downwardly and outwardly therefrom,
the width of said tabs being such that they will snap inwardly behind and above the flanges of said longitudinally extending members,
the upper edge of each said cut away portion engaging the top of the corresponding portion of each transversely extending member,
the width of each cut away portion at its upper end being substantially equal to the width of each transversely extending member less the width of the tabs.

References Cited in the file of this patent

UNITED STATES PATENTS

| 2,591,346 | Fitzgerald | Apr. 1, 1952 |
| 2,919,841 | Helm | Jan. 5, 1960 |

FOREIGN PATENTS

| 32,257 | Switzerland | Apr. 22, 1905 |